US012770448B2

(12) United States Patent
Asher et al.

(10) Patent No.: US 12,770,448 B2
(45) Date of Patent: Oct. 20, 2026

(54) SYSTEMS AND METHODS FOR MANAGEMENT OF DUAL SIDED DELIVERY LOCKER ARRAY

(71) Applicant: Grubbrr SPV LLC, Boca Raton, FL (US)

(72) Inventors: Bhavin Asher, Boca Raton, FL (US); Farshad Tafazzoli, Delray Beach, FL (US); Smit Patel, Boca Raton, FL (US)

( * ) Notice: Subject to any disclaimer, the term of this patent is extended or adjusted under 35 U.S.C. 154(b) by 0 days.

(21) Appl. No.: 17/944,138

(22) Filed: Sep. 13, 2022

(65) Prior Publication Data

US 2024/0087386 A1 Mar. 14, 2024

(51) Int. Cl.
*G07C 9/00* (2020.01)

(52) U.S. Cl.
CPC ................................ *G07C 9/00912* (2013.01)

(58) Field of Classification Search
CPC ................................................. G07C 9/00912
See application file for complete search history.

(56) References Cited

U.S. PATENT DOCUMENTS

| | | | | |
|---|---|---|---|---|
| 5,820,018 | A * | 10/1998 | Stacy | A47G 29/16 232/24 |
| 9,842,351 | B2 * | 12/2017 | Lenahan | G06Q 20/384 |
| 10,546,267 | B2 * | 1/2020 | Deemter | A47J 39/003 |

* cited by examiner

*Primary Examiner* — Daniell L Negron
(74) *Attorney, Agent, or Firm* — Inovue Advisors, LLC

(57) ABSTRACT

Systems and methods of operating a locker array including a plurality of merchant doors a plurality of customer doors is provided. A customer order is received. A merchant code is created. A customer code is created. A notification is received from a merchant that preparation of the customer order is complete. A locker is selected from the locker array for fulfillment of the customer order in response to notification that the customer order is complete. The merchant code is rendered operable to open a merchant door of the locker selected from the locker array and the customer code is rendered operable to open a customer door of the locker selected from the locker array.

15 Claims, 5 Drawing Sheets

SYSTEMS AND METHODS FOR MANAGEMENT OF DUAL SIDED DELIVERY LOCKER ARRAY

BACKGROUND OF THE INVENTION

The use of locker arrays to distribute products to customers has increased as demand for self-service shopping has increased. A locker array is a group of lockers that are grouped together in various configurations. Many merchants station locker arrays at strategic locations in various geographic areas so that customers can pick up previously ordered products. Typically, a customer is provided with a code (e.g. bar code, QR code, etc.), which they scan at the locker array. When the code is scanned, a locker door opens, which contains a purchased product. To load the locker with a purchased product, a courier takes the product to the location of the locker and selects a locker. The courier then inserts the product in the locker through the same door that the customer or some other entity (courier, robot, etc.) will use to pick up the product.

The use of such locker arrays could be advantageous in the restaurant setting, particularly in a self-service setting, such as cafeterias and food courts. A problem exists, however, in that the single-sided lockers used for online products are not practical for delivery of restaurant orders. Loading restaurant orders into locker arrays poses a host of logistical challenges. For example, it would be undesirable to have restaurant employees and customers simultaneously converge on a locker array to load and retrieve orders due to the congestion that would result. Accordingly, a locker array is needed that is appropriate for restaurant orders, and systems and methods for managing such a locker array.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

In one embodiment, a method of operating a locker array including a plurality of merchant doors a plurality of customer doors is provided. A customer order, in the form of an electronic message, is received. In one embodiment, electronic customer order messages contains parameters defining a plurality of aspects of the order, e.g., quantity, price, time of order placement, target time for order fulfillment, etc. A merchant code is created. A customer code is created. A notification is received from a merchant that preparation of the customer order is complete. A locker is selected from the locker array for fulfillment of the customer order in response to receipt of notification that the customer order is complete. The merchant code is rendered operable to open a merchant door of the locker selected from the locker array and the customer code is rendered operable to open a customer door of the locker selected from the locker array.

In one embodiment, the merchant code is received from a controller of the locker array. The merchant code is validated. A controller of the locker array is instructed to open the merchant door. In one embodiment, the customer code is received from the controller. The customer code is validated. The controller is instructed to open the customer door. In one embodiment, the merchant door and the customer door are on opposing sides of the locker selected from the locker array. In one embodiment, the customer code and the merchant code are created when the customer order is created. In one embodiment, a plurality of factors is utilized to determine an optimal location of the selected locker. In one embodiment, the plurality of factors includes at least two of the time of day, a location of an ordering point from which the customer order originated, and a location of the customer at completion of the customer order. In one embodiment, a plurality of lockers is selected and the merchant code and customer code are associated with the plurality of lockers.

In one embodiment a system is provided. The system operates a locker array having a merchant side having a plurality of merchant doors and a customer side having a plurality of customer doors. The system includes a memory and at least one module stored in the memory. The module is configured to receive a customer order, create a merchant code, create a customer code, receive notification from the merchant that preparation of the customer order is complete, select a locker from the locker array for fulfillment of the customer order in response to notification that the customer order is complete, and make the merchant code operable to open a merchant door of the locker and make the customer code operable to open a customer door of the locker.

In one embodiment, the at least one module is further configured to receive the merchant code from a controller of the locker array, validate the merchant code, and instruct the controller to open the merchant door. In one embodiment, the at least one module is configured to receive the customer code from the controller, validate the customer code, and instruct the controller to open the customer door. In one embodiment, the merchant door and the customer door are on opposing sides of the locker selected from the locker array. In one embodiment, the customer code and the merchant code are created when the customer order is created. In one embodiment, selection of the locker comprises utilization of a plurality of factors to determine an optimal location of the selected locker. In one embodiment, the plurality of factors includes at least two of the time of day, a location of an ordering point from which the customer order originated, and a location of the customer at completion of the customer order. In one embodiment, selection of the locker comprises selection of a plurality of lockers and association of the merchant code and customer code comprises association of the merchant code and the customer code with the plurality of lockers.

In one embodiment, a locker array is provided. The locker array includes a merchant side including a plurality of merchant doors and a customer side including a plurality of customer doors. The merchant doors and the customer doors are on opposing sides of the locker array. A controller is operable to open the merchant doors and the customer doors. In one embodiment, the system includes a management module that is configured to receive a customer order, create a merchant code and a customer code. In this embodiment the management module preferably receives a notification from the merchant that preparation of the customer order is complete. A plurality of lockers is selected from the locker array for fulfillment of the customer order in response to notification that the customer order is complete. The merchant code and the customer code are associated with the plurality of lockers. The system is constructed such that merchant doors of the plurality of lockers open in response to the merchant code. The customer code is made operable to open customer doors of the plurality of lockers.

In one embodiment, the merchant code is received from the controller and the merchant code is validated. The controller of the locker array is instructed to cause a first door of the plurality of lockers to open in response to receipt of the merchant code. The controller of the locker array is instructed to cause a second door of the plurality of lockers to open when the controller detects that the first door is closed. In one embodiment, a management module is configured to receive the customer code from the controller, validate the customer code, instruct the controller of the locker array to open a third door of the plurality of lockers in response to receipt of the customer code, and instruct the controller of the locker array to open a fourth door of the plurality of lockers when the controller detects that the third door is closed. In one embodiment, the management module selects the plurality of lockers based on at least one of time of day, a location of an ordering point from which the customer order originated, and a location of the customer at completion of the customer order.

BRIEF DESCRIPTION OF THE DRAWINGS

A more detailed understanding may be had from the following description, given by way of example in conjunction with the accompanying drawings wherein.

DETAILED DESCRIPTION

Figure 1:
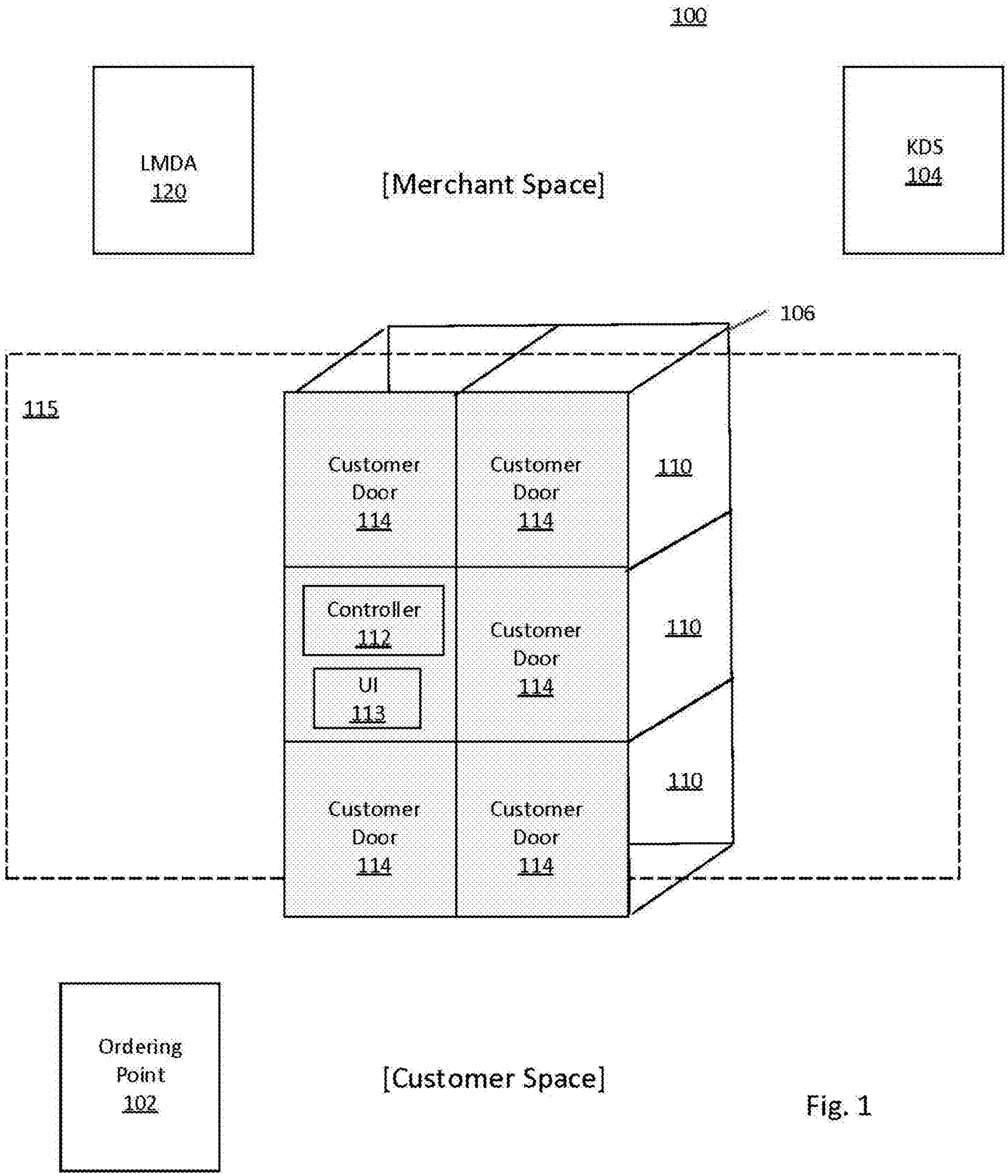
FIG. 1 is a functional block diagram, taken from an example customer side, of an example system including a locker array deployed in a restaurant space.
Figure 2:
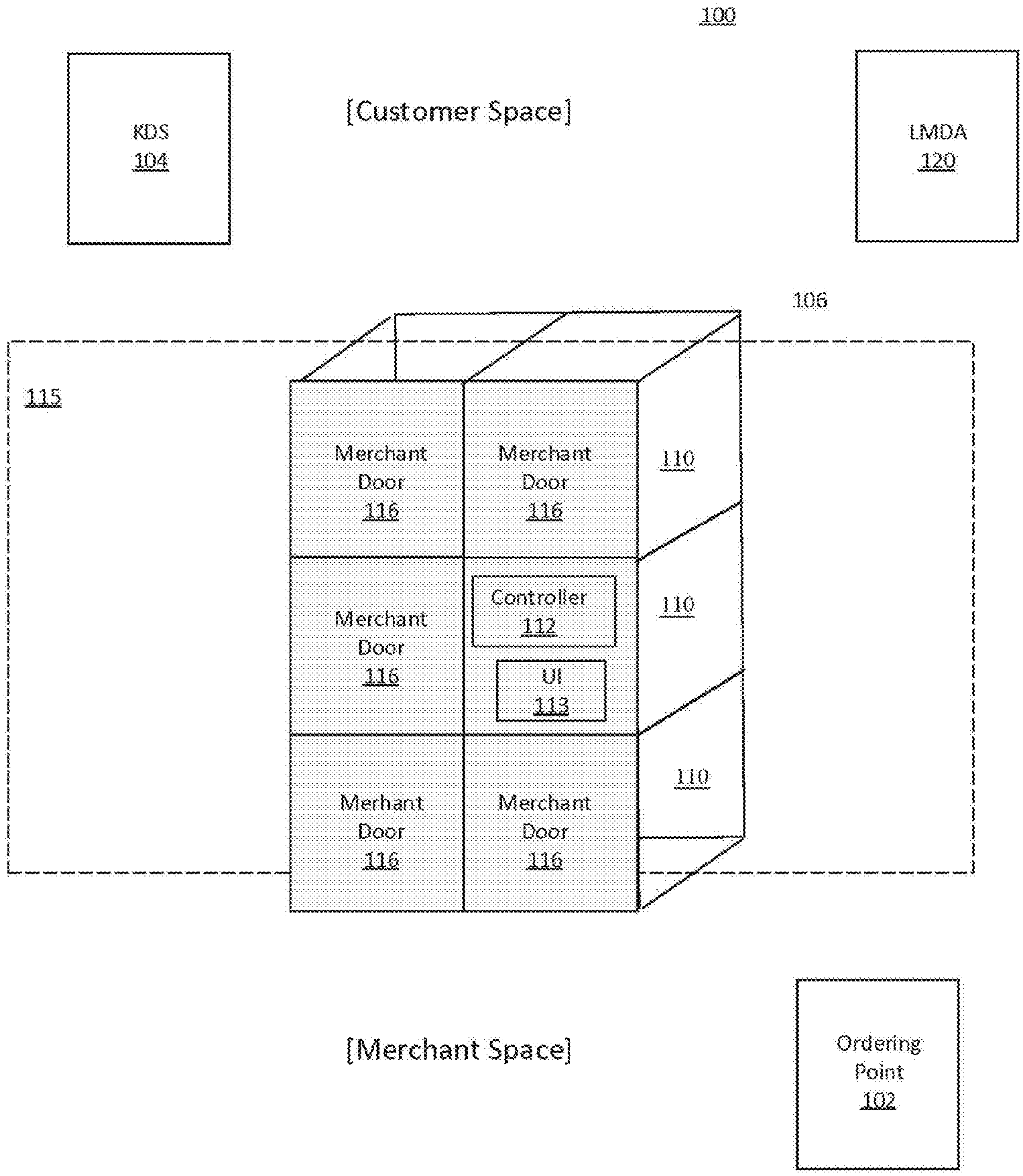
FIG. 2 is a functional block diagram, take from a merchant side, of the system of FIG. 1

Referring to FIGS. 1 and 2, a system 100 is depicted. In one example, system 100 includes at least one instance of ordering point 102, at least one instance of a kitchen display system 104, and at least one dual sided locker array 106. It should be noted that the description provided herein is directed at order fulfilment in a restaurant, but the principles described herein are applicable to other settings, such as retail stores, warehouses, shipping systems, and the like.

Figure 5:
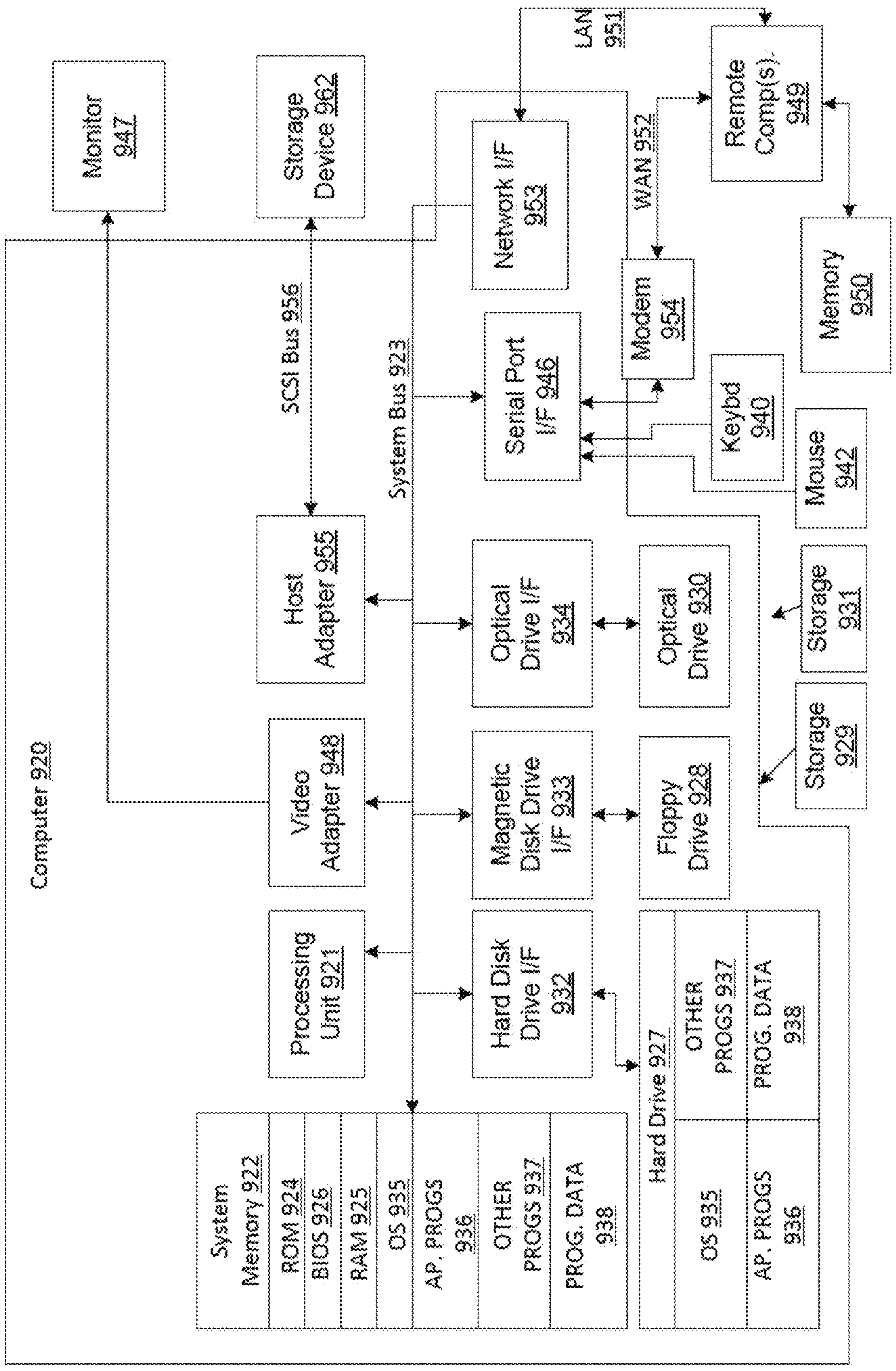
FIG. 5 is an exemplary block diagram representing a computer system in which aspects of the processes and systems disclosed herein or portions thereof may be incorporated.

In one example, ordering point 102 is a self-service kiosk. In another example, ordering point 102 may be a point-of-sale (POS) system, an ordering app operating on a computer or mobile device (on premises or off premises), an employee operating such devices, and combinations thereof. The ordering point 102 is where a user places an order into system 100 for eventual delivery to a customer through locker array 106. Ordering point 102, will generally have one or more input/output devices that allow a customer to interact with system and place orders. Ordering point 102 will also generally have one or more communication interfaces that allow ordering point 102 to connect to and integrate with KDS 104, locker 106, and to one or more networks, such as the internet. Customers in some implementations may connect to system 100 over a network and place orders. An exemplary embodiment of a device that could function as ordering point is shown in FIG. 5.

Referring further to FIGS. 1 and 2, in one embodiment, kitchen display system (KDS) 104 receives orders from ordering point 102 and manages the orders for delivery to customers. KDS 104 in one example may include one or more input/output devices as known to those of ordinary skill in the art (e.g., touchscreens) that enable employees to track orders as they are submitted. Employees interact with KDS 104 by selecting orders for fulfilment and indicating when orders have been delivered to customers or servers. In an exemplary kitchen setting, the KDS 104 may display a queue of orders for various items. A restaurant cook may select one or more orders for fulfilment. The cook can then prepare and send the order to a customer without worrying that another cook may duplicate the order. The cook would then enter data into KDS 104 indicating that order has been fulfilled. FIG. 5 depicts an exemplary computing device on which KDS 104 may be implemented.

Referring to FIG. 1, in one embodiment, dual sided locker array 106 comprises a plurality of lockers 110. The lockers 110 in one example may be enclosed in a cabinet. In another, example the lockers 110 may be stacked next to each other without an external cabinet. In another example, the lockers 110 may be comprised of a plurality of locker arrays 106, which are distributed from each other over a space. For example, in a dining hall, there may be a first array 106 of lockers 110 in one location (e.g., in the front) and a second array 106 of lockers 110 at another location (e.g. in the back). The lockers 110 provide secure interior space into which on or more items may be stored. In one embodiment, the locker hardware includes a locking device, such as latch, which can be opened electronically. In one embodiment, the lockers 110 include opening and closing mechanisms that allow the lockers to be opened and closed automatically. The lockers 110 may also include mechanical override switches that allow the lockers 110 to be opened mechanically, such as with a key. In FIG. 1, locker array 106 is shown from a customer facing side. Accordingly, there are a plurality of customer doors 114. Customer doors 114 are meant to provide customers access to the interior of lockers 110.

Referring further to FIG. 1, in one embodiment, there is a controller 112 embedded within locker array 106. Controller 112 is operable to open and close customer doors 114. In one embodiment, controller 112 includes a user interface 113 through which users may interact with controller 112. User interface 113 may take a number of forms. For instance, user interface 113 could be touch screen, a keypad, a bar code reader, a voice recognition system, computing systems for receiving and processing commands as known by those of ordinary skill in the art, and the like. User interface 113 could be a combination or sub-combination of such devices. Controller 112 is in data communication with ordering point 102, KDS 104, and LMDA 120. LMDA 120 is a locker management and delivery application, which in one example controls access to lockers 110. FIG. 5 depicts an exemplary device on which user controller 112 and LMDA 120 may be implemented.

Referring further to FIG. 1, in one embodiment, a wall 115 bisects the locker array 106. The wall 115 may have a hole through which locker array 106 may be inserted. In such a configuration, a customer space and a merchant space is defined. Because the locker array 106 is two-sided, locker array 106 has a customer side and a merchant side. Merchants can deliver products to the locker array 106 from the merchant side, and customers can pick up products from the locker array 106 from the customer side. Such a configuration allows customers and merchants to interact without physically encountering each other. Accordingly, congestion is avoided, and the order fulfillment process is more efficient than other systems.

Referring to FIG. 2, a view of locker array 106 from the merchant side is now provided for illustrative purposes. In one embodiment, there are a plurality of merchant doors 116 through which merchants may interact with the space defined by lockers 110. In one example, relating to a restaurant embodiment, merchant space may include kitchen equipment for the fulfillment of food orders. Accordingly, merchant space may include one or more user interfaces for KDS 104 such that one or more cooks may track and fulfill restaurant orders. In one example, when a cook finishes an order, the cook can place the order in a locker 110 through merchant door 116, such that the order can be picked up by or for a customer by opening a corresponding customer door 114 on the other side. The controller 112 and user interface 113 may be the same controller 112 and user interface a used on the customer side, or alternatively there could be one controller 112 and/or user interface 113 for the merchant side and one controller 112 and/or user interface 113 for the customer side. In the case of multiple controllers 112 and user interfaces 113, there would be coordination between them to cooperate to perform operations described herein.

Referring now to FIGS. 1 and 2, in one embodiment, LMDA 120 is utilized to manage the distribution of orders through locker array 106. In one example, LMDA 120 operates on a stand-alone device. In another example, LMDA 120 may operate as part of KDS 104. In one example, LMDA 120 may operate off site (e.g., as software as a service, or in the cloud). In one example, LMDA 120 may operate as a combination of the preceding examples. In one embodiment, LMDA 120 includes one or more application programming interfaces (APIs) that connect to ordering point 102, KDS 104, and/or locker array 106. FIG. 5 depicts an exemplary device on which LMDA 120 may be implemented. It should be understood that ordering point 102, KDS 104, controller 112, and LMDA 120 are shown as distinct functional blocks to describe their functionality for illustrative purposes. Such a representation should not be construed as limiting. The functionality described by such blocks can be combined or divided as part of a distributed processing environment. Furthermore, it should be understood that ordering point 102, KDS 104, controller 112, and LMDA 120 are in communication with each other, either directly or indirectly. For instance, ordering point 102 may communicate directly with KDS 104 or it may communicate with KDS 104 through another component, such as LMDA 120. Similarly, KDS 104 may communicate directly with LMDA 120 or it may communicate indirectly with LMDA 120 through ordering point. These examples are provided for illustrative purposes only and should not be construed as limiting.

Referring further to FIGS. 1 and 2, LMDA 120 tracks the orders that are in process and efficiently distributes the orders to the lockers 110 in a manner that is optimally suited for delivery of the orders. For example, in a large facility, there may be a plurality of ordering points and a plurality of locker arrays 106. It may not be efficient to receive an order at a particular ordering point 102 and then fulfill the order at a locker array 106 located at the farthest possible point from ordering point 102 because the configuration of the facility may make it likely that the customer will sit near the ordering point 102 from which the order was taken. Accordingly, LMDA 120 in one example may direct order fulfillment to the nearest locker 110 available to the ordering point 102 from which an order originated. In another embodiment LMDA 120 may track a customer location by using a mobile device, such as a smartphone or smart watch connected to the user and identify the customer's location as they wait for an order. Accordingly, LMDA 120 may direct an order to a locker 110 nearest to the customer's actual location. In another example, a customer may have a physical condition that prevents them from accessing lockers 110 at certain locations. Therefore, LMDA 120 may direct an order to the nearest locker 110 that is ADA compliant.

In another embodiment, LMDA 120 may execute load balancing to ensure that orders are being spread out over the available lockers 110, rather than concentrated in a few. LMDA 120 in one example may use data reflecting historic usage patterns to prevent unnecessary congestion at certain locations or at certain times. For instance, during a busy time, like lunch, LMDA 120 may load balance, but at less busy times, may elect to not load balance. In another example, LMDA 120 may coordinate the access of multiple lockers 110 for a single order. For instance, a customer may have a large order that requires multiple lockers 110 for fulfillment. Accordingly, to fulfill the order, LMDA 120 would have to identify multiple available lockers 110 and control the access to the multiple lockers 110 as set forth herein. Exemplar load balancing methods are described in U.S. patent application Ser. No. 17/943,011, which is hereby incorporated by reference in its entirety.

Figure 3:
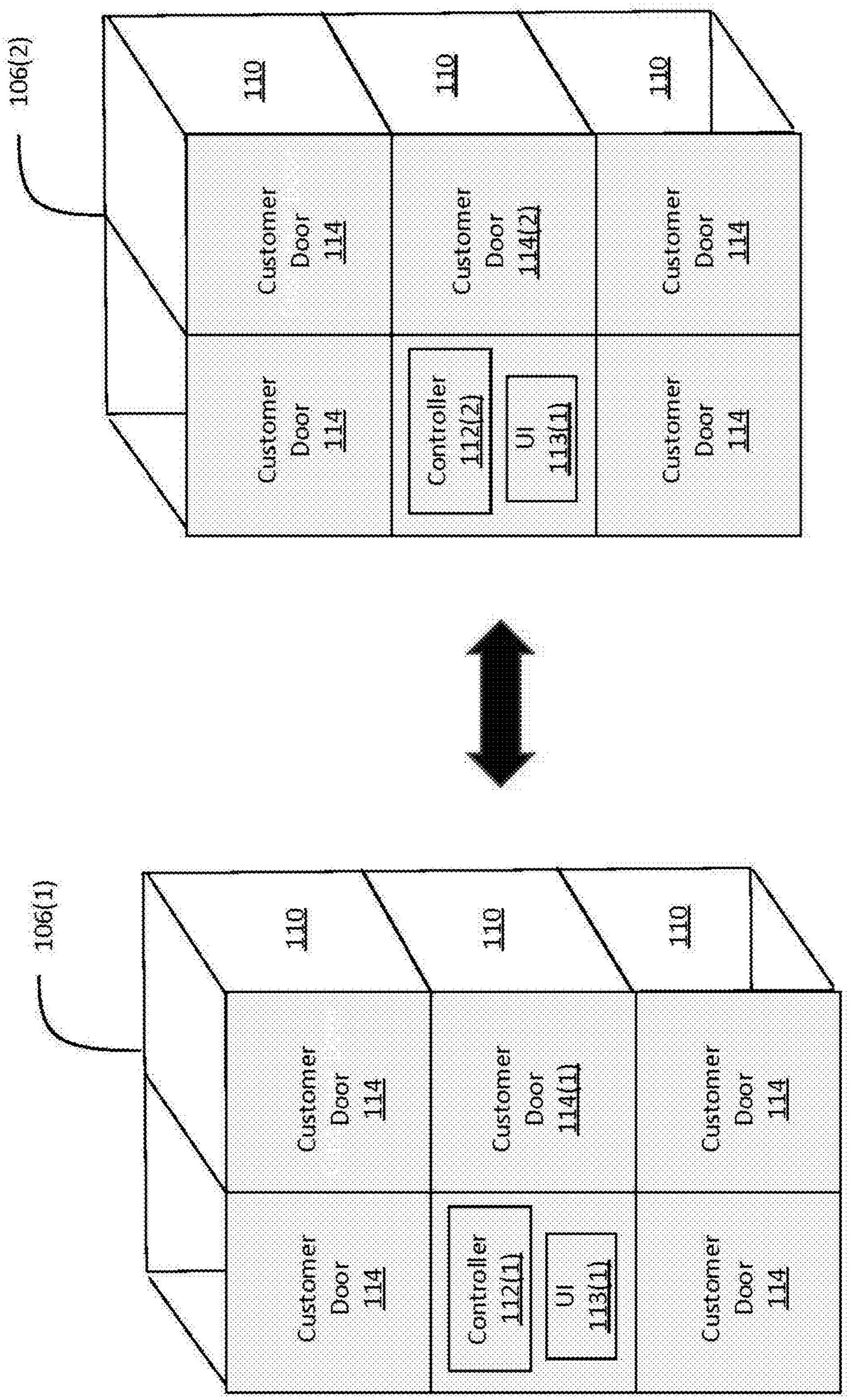
FIG. 3 depicts two example locker arrays in communication with each other.

Referring to FIG. 3, in one embodiment in which multiple locker arrays 106(1), 106(2) are used, the controller 112 of each locker array 106(1), 106(2) may be in data communication with the other locker array. In such a configuration, the locker arrays 106(1), 106(2) can communicate with each other to accomplish joint tasks. For example, two locker arrays 106(1), 106(2) may be used to distribute a multi-item order to a customer. A customer may pick up one item at a first locker array 106(1) and a second item at a second locker array 106(2). The first locker array 106(1) may open a first customer door 114(1) (for a first item), but the second locker array 106(2) may keep a second customer door (containing a second item) 114(2) closed. After the first customer door 114(1) is opened and closed, the controller 112(1) of the first locker array 106(1) notifies the controller 112(2) of the second locker array 106(1) than it can open the second customer door 114(2), thereby allowing the customer to retrieve the second product. It should be noted that the same coordination of opening and closing multiple doors can be performed within a single locker array 106 by a single controller 112. Furthermore, it should be noted that single controller 112 could be used to control multiple locker arrays 106(1), 106(2); for example, a master/slave relationship could be implemented between one controller 112 with respect to another controller. It should be noted that two locker arrays 106(1), 106(*n*) are shown for illustrative purposes, but additional numbers n of locker arrays could also be used in system 100.

Referring further to FIGS. 1 and 2, an exemplary description of the operation of system 100 will now be provided for illustrative purposes. In one embodiment, a customer interacts with ordering point 102 and places in order. After payment, the customer may be provided with a receipt through user interface 113. In one example, the receipt may be a printed receipt on paper. In one example, the receipt may be an electronic receipt sent to the customer's mobile device or computer. The receipt may include a code provide by LMDA 120 that allows the customer to open a customer door 114 when the customer's order is fulfilled.

KDS 104 receives the order and outputs the order on its input/output devices for fulfillment by the merchant. One or more employees of the merchant fulfill the order. When the order is fulfilled, the employees interact with KDS 104 and indicates that the order is fulfilled. KDS 104 then interacts with LMDA 120, which then assigns a locker 110 for fulfillment of the order. LMDA 120 sends a code to KDS 104 that is operable to open a particular locker door 110. KDS 104 receives the code and outputs it to an employee. The employee may receive the code on a printed receipt or electronically on a computing device. The code may be a numerical code or a bar code or QR code. The employee inputs the code through UI 113 and a merchant door 116 will open, and the employee can then insert the order into the corresponding locker 110.

In one embodiment, the customer code and the merchant code may be created at the beginning of a order process and assigned to a locker 110 later. For example, LMDA 120 may provide the codes to the customer and merchant but wait until after the order is fulfilled to assign the codes to a particular locker 110. In this way, LMDA 120 assigns lockers at the time of order fulfillment, which increases efficiency of the system 100 because not all orders take the same amount of time to prepare. Therefore, LMDA 120 assigns lockers 110 on a "just in time" basis rather than reserving lockers 110 at the beginning of an order.

Figure 4:
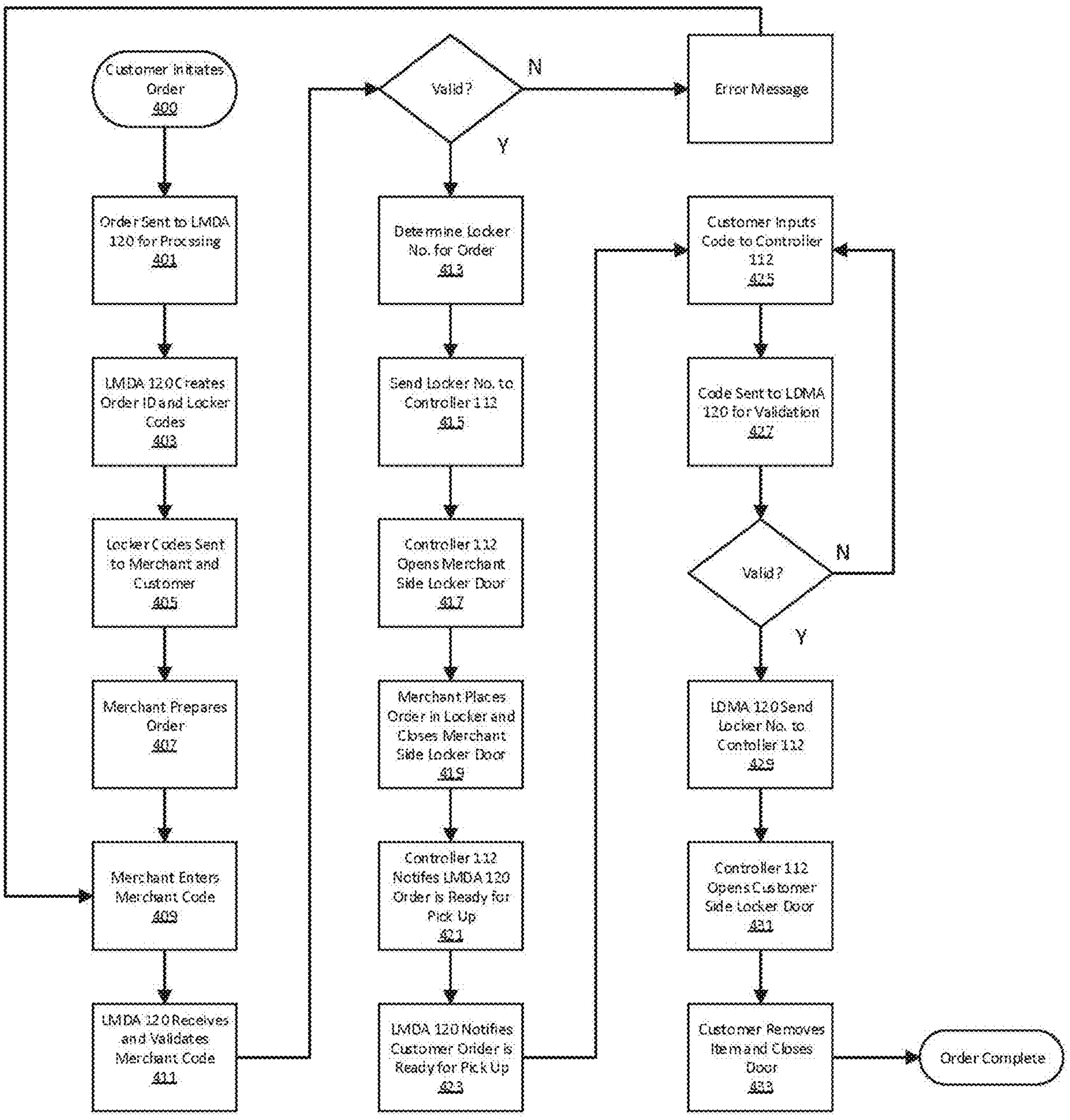
FIG. 4 illustrates an exemplary process utilized by the system of FIG. 1.

Referring to FIG. 4, an exemplary process operable on the system of FIGS. 1 and 2 will now be described for illustrative purposes. In FIG. 4, a customer initiates an order in step 400 at an ordering point 102. The order may originate by customer interacting directly with ordering point 102 or through an intermediary, such as an employee of merchant. As described earlier, the order may be for a product, or in the instant example, it may be a restaurant order. When the order is created, the customer may pay for the order. When the customer is finished, the order is sent to LMDA 120 in step 401. LMDA 120 receives the order and, in step 403, creates an order ID and corresponding customer and merchant codes. The customer code is operable to open a customer door 114, and the merchant code is operable to open a merchant door 116. In step 405, the order ID, customer code, and merchant code are sent to the customer and merchant, respectively. In one example, the customer code is provided on a receipt outputted to the customer at ordering point 102. Alternatively, the customer code may be provided to the customer on another device, such as the customers personal computing devices. In one example, the merchant code is sent to merchant on KDS 104 along with the order details, although it could be sent to another computing device controlled by the merchant or merchant's employee.

In step 407, the merchant prepares the order. When the merchant is done preparing the order the merchant sends the merchant code to controller 120 in step 409. In one example, the merchant may provide the merchant code to controller through UI 113. For example, the merchant may have a paper ticket, with the code printed on it, and the merchant may scan the code on a bar code reader. In one example, the merchant may provide the code to controller through another device, such as a mobile device, or through KDS 104. In step 411, controller 120 sends the merchant code to LMDA 120, which then validates the code. In one example, LMDA 120 validates the merchant code by comparing it to the merchant code that it created in step 303. If the merchant code is not validated, then an error message is output and then the process returns to step 309, and the merchant can reenter the merchant code. If the merchant code is validated, then the process proceeds to step 413. In step 413 LMDA 120 determines a locker 110 for the order. As was discussed earlier herein, determining the locker number may depend on a number of factors.

For example, LMDA 120, as a first step, may determine what lockers 110 are available. Then LMDA 120 may determine, of the available lockers 110, which lockers 110 are closest to the ordering point 102 at which the order originated. In one embodiment, LMDA 120 may determine the location of the consumer and select a locker 110 close to the consumer. In one embodiment, LMDA 120 may determine where the customer is likely to be at the time the order is ready. Such a determination may be made based on the customer's historical usage patterns or from historical data related to the site at which system 100 resides or from site map data indicating where the crowded areas are within the site, and where the less crowded areas are within the site. In step 415, LMDA 120 sends the locker number to controller 112. In step 417, controller 112 causes the merchant door 116, corresponding to the selected locker 110, to open.

In step 419, the merchant inserts the order into the selected locker 110 and closes the merchant door 116. In step 421, controller 112 notifies LDMA 120 that the order is ready for pickup. It should be noted that the notification that the order is ready for pick-up is not based on an explicit notification. For instance, the notification could be an inference from a signal confirming that the merchant door opened and then closed in step 419. In step 423, LMDA 120 notifies the customer that the order is ready for pick-up. In step 425, the customer inputs the customer code to controller 120. In one example, the customer may provide the code by scanning a bar code at UI 122. In one example, the customer may provide the code by entering it into a keypad. In another example, the customer may send the code to controller from a computing device, such as a mobile device, through a near field communication (NFC) technology. In step 427, controller 120 sends the inputted customer code to LMDA 120 for validation. In one example, controller 120 validates the customer code by comparing it to the customer code it created in step 403. If the code is not valid, the process returns to step 425 so the customer can reenter the code. If the code is valid, then, in step 429, LDMA sends the locker number, corresponding to code, to controller 112. In step 431, the controller 112 causes customer door 114 to open. In step 433, the user removes the item from the corresponding locker 110 and shuts the door. The process then terminates.

It should be noted that the preceding steps are provided to depict illustrative operation of system 100. The preceding steps may be combined, divided, or rearranged without departing from the scope of the present application.

FIG. 5 is a block diagram representing a system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives, and their associated computer-readable media, provide nonvolatile storage of computer readable instructions, data structures, program modules and other data for the computer 920. As described herein, computer-readable media is a tangible, physical, and concrete article of manufacture and thus, not a signal, per se.

Although the exemplary environment described herein employs a hard disk, a removable magnetic disk 929, and a removable optical disk 931, it should be appreciated that other types of computer readable media, which can store data, that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), cloud implemented memory, and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 4 also includes a host adapter 955, a Small Computer System Interface (SCSI) bus 956, and an external storage device 962 connected to the SCSI bus 956.

The computer 920 may operate in a networked environment using logical connections to one or more remote computers such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 4. The logical connections depicted in FIG. 4 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used, such as Bluetooth and Wi-Fi.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media, implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a locker array having a merchant side including a plurality of merchant doors and a customer side including a plurality of customer doors, wherein the merchant doors and the customer doors are on opposing sides of the locker array the method comprising:

- rendering a controller operable to open the merchant doors and the customer doors;
- receiving a customer order;
- creating a merchant code;
- creating a customer code;
- receiving notification from the merchant that preparation of the customer order is complete;
- receiving the merchant code from the controller of the locker array;
- validating the merchant code received from the controller of the locker array;

selecting a plurality of lockers from the locker array for fulfillment of the customer order in response to notification that the customer order is complete;

associating the merchant code and the customer code with the plurality of lockers;

making the merchant code operable to open merchant doors of the plurality of lockers and making the customer code operable to open customer doors of the plurality of lockers;

instructing the controller of the locker array to cause a first door of the plurality of lockers to open in response to receipt of the merchant code; and instructing the controller of the locker array to cause a a second door of the plurality of lockers to open when the controller detects that the first door is closed.

2. The method of claim 1, further comprising:

receiving the customer code from the controller; and validating the customer code.

3. The method of claim 2, wherein the merchant door and the customer door are on opposing sides of a locker selected from the locker array.

4. The method of claim 1, wherein the customer code and the merchant code are created when the customer order is created.

5. The method of claim 1, wherein selecting the plurality of lockers comprises utilizing a plurality of factors to determine an optimal location of the plurality of lockers.

6. The method of claim 5, wherein the plurality of factors includes at least two of the time of day, a location of an ordering point from which the customer order originated, and a location of the customer at completion of the customer order.

7. A system for operating a locker array having a merchant side having a plurality of merchant doors and a customer side having a plurality of customer doors, wherein the merchant doors and the customer doors are on opposing sides of the locker array, comprising:

a memory;

a controller operable to open the merchant doors and the customer doors; and at least one management module stored in the memory and configured to:

receive a customer order;

create a merchant code;

create a customer code;

receive a notification from the merchant that preparation of the customer order is complete;

receive the merchant code from the controller;

validate the merchant code;

select a plurality of lockers from the locker array for fulfillment of the customer order in response to notification that the customer order is complete;

associate the merchant code and the customer code with the plurality of lockers;

make the merchant code operable to open merchant doors of the plurality of lockers and make the customer code operable to open customer doors of the plurality of lockers;

instruct the controller to cause a first door of the plurality of lockers to open in response to receipt of the merchant code; and instruct the controller of the locker array to cause a second door of the plurality of lockers to open when the controller detects that the first door is closed.

8. The system of claim 7, wherein the at least one management module is further configured to:

receive the customer code from the controller;

validate the customer code.

9. The system of claim 7, wherein the first door and the second door are on opposing sides of the plurality of lockers.

10. The system of claim 7, wherein the customer code and the merchant code are created when the customer order is created.

11. The system of claim 7, wherein selection of the plurality of lockers comprises utilization of a plurality of factors to determine an optimal location of the plurality of lockers.

12. The system of claim 11, wherein the plurality of factors includes at least two of the time of day, a location of an ordering point from which the customer order originated, and a location of the customer at completion of the customer order.

13. A locker array having a merchant side including a plurality of merchant doors and a customer side including a plurality of customer doors, wherein the merchant doors and the customer doors are on opposing sides of the locker array, the locker array comprising:

a controller operable to open the merchant doors and the customer doors;

a management module that is configured to:

receive a customer order;

create a merchant code;

create a customer code;

receive a notification from the merchant that preparation of the customer order is complete;

receive the merchant code from the controller;

validate the merchant code;

select a plurality of lockers from the locker array for fulfillment of the customer order in response to notification that the customer order is complete;

associate the merchant code and the customer code with the plurality of lockers;

make the merchant code operable to open merchant doors of the plurality of lockers;

make the customer code operable to open customer doors of the plurality of lockers;

instruct the controller of the locker array to cause a first door of the plurality of lockers to open in response to receipt of the merchant code; and instruct the controller of the locker array to cause a second door of the plurality of lockers to open when the controller detects that the first door is closed.

14. The locker array of claim 13, wherein the management module is configured to:

receive the customer code from the controller;

validate the customer code;

instruct the controller of the locker array to cause a third door of the plurality of lockers to open in response to receipt of the customer code; and instruct the controller of the locker array to a fourth door of the plurality of lockers to open when the controller detects that the third door is closed.

15. The locker array of claim 14, wherein the management module selects the plurality of lockers based on at least one of time of day, a location of an ordering point from which the customer order originated, and a location of the customer at completion of the customer order.

* * * * *